United States Patent [19]

Misra et al.

[11] Patent Number: 4,595,581
[45] Date of Patent: Jun. 17, 1986

[54] BOEHMITE PRODUCTION BY PRECIPITATION FROM SODIUM ALUMINATE SOLUTION AT ELEVATED TEMPERATURES

[75] Inventors: Chanakya Misra; Thinnalur J. Sivakumar, both of Plum Borough, Pa.

[73] Assignee: Aluminum Company of America, Pittsburgh, Pa.

[21] Appl. No.: 741,490

[22] Filed: Jun. 5, 1985

Related U.S. Application Data

[63] Continuation-in-part of Ser. No. 680,010, Dec. 10, 1984, abandoned.

[51] Int. Cl.[4] ............................................... C01F 7/04
[52] U.S. Cl. ..................................... 423/625; 423/127; 423/629; 23/301; 23/305 A
[58] Field of Search ....................... 423/127, 625, 629; 23/301, 305 A

[56] References Cited

U.S. PATENT DOCUMENTS

| | | | |
|---|---|---|---|
| 2,668,751 | 2/1954 | Porter | 23/143 |
| 3,466,142 | 9/1969 | Hambly | 23/143 |
| 3,486,850 | 12/1969 | Day | 23/143 |
| 3,983,212 | 9/1976 | Lowenstein et al. | 423/127 |
| 4,049,773 | 9/1977 | Majdell et al. | 423/629 |
| 4,201,749 | 5/1980 | Yamada et al. | 423/127 |
| 4,305,913 | 12/1981 | Anjier | 423/629 |
| 4,311,486 | 1/1982 | Yamada et al. | 423/629 |

Primary Examiner—H. T. Carter
Attorney, Agent, or Firm—Glenn E. Klepac

[57] ABSTRACT

Substantially pure boehmite is produced by heating an aqueous sodium aluminate solution to a temperature of about 115°–145° C., preferably about 120°–130° C., treating the heated solution with alumina seed material and separating a boehmite precipitate from the solution. A particularly preferred seed material is boehmite gel.

19 Claims, 6 Drawing Figures

BOEHMITE PRODUCTION BY PRECIPITATION FROM SODIUM ALUMINATE SOLUTION AT ELEVATED TEMPERATURES

CROSS-REFERENCE TO RELATED PATENT APPLICATION

This application is a continuation-in-part of U.S. Ser. No. 680,010, filed Dec. 10, 1984 and now abandoned.

BACKGROUND OF THE INVENTION

The present invention relates to a process for production of boehmite (also known as alpha-alumina monohydrate) in substantially pure form.

Boehmite is the mineral name of one of the oxide-hydroxides of aluminum and has the chemical formula AlO(OH). Processes for making boehmite are known in the art. However, each of the prior art processes suffers from one or more serious disadvantages making it less than entirely suitable for its intended purpose.

The three principal types of methods previously used to produce boehmite can be summarized as follows:

a. Hydrothermal—Treatment of aluminum trihydroxide at high temperature and steam pressure produces well-crystallized boehmite.

b. Neutralization—Aqueous solutions of aluminum salts such as aluminum chloride, aluminum sulfate and aluminum nitrate are neutralized by alkalis such as NaOH, KOH and NH$_4$OH, or aluminates such as sodium aluminate are neutralized by an acid (e.g. HCl or H$_2$SO$_4$) or CO$_2$ to produce gelatinous boehmite.

c. Hydrolysis—Organic aluminum compounds such as aluminum alkylates are hydrolyzed with water to produce gelatinous boehmite.

Boehmites produced by the latter two types of methods are generally of a gelatinous nature and are characterized by water contents that are significantly greater than stoichiometric (15.0 wt % for pure boehmite) and considerable broadening of the X-ray diffraction lines.

It is a principal objective of the present invention to produce boehmite directly by precipitation from a caustic aluminate liquor without requiring any hydrothermal conversion or chemical neutralization operation.

It is a related objective of the invention to provide a process for production of substantially pure boehmite that is more economical than prior art processes.

An advantage of the present invention is that the used aluminate solution from which boehmite has been precipitated can be reused for digestion of bauxite according to the Bayer process.

Additional objectives and advantages of the present invention will become apparent to persons skilled in the art from the following detailed description and drawings.

SUMMARY OF THE INVENTION

The present invention is a process for producing boehmite by precipitation from an aqueous aluminate solution at elevated temperatures. The aluminate solution contains about 100–400 g/l caustic soda (expressed as Na$_2$CO$_3$) and about 0.50–0.80 grams Al$_2$O$_3$ per gram of caustic soda (expressed as Na$_2$CO$_3$). The term "caustic soda" as used herein refers to sodium hydroxide.

The aluminate solution preferably has a caustic soda content of about 140–240 g/l (expressed as Na$_2$CO$_3$), optimally about 190–210 g/l (expressed as Na$_2$CO$_3$). The solution also preferably contains about 0.60–0.70 grams Al$_2$O$_3$ per gram of caustic soda (expressed as Na$_2$CO$_3$).

The caustic-containing aluminate solution is heated to a temperature of about 115°–145° C., preferably about 115°–135° C. or 140° C. and more preferably about 120°–130° C. A particularly preferred temperature is about 125° C.

The heated solution is treated with a seed material consisting essentially of alumina to form a precipitate comprising greater than about 95 wt % boehmite. The seed material preferably consists essentially of boehmite and boehmite gel is particularly preferred. The terms "consisting essentially of alumina" and "consisting essentially of boehmite" as used herein refer to alumina and boehmite in substantially pure form. These terms exclude bauxite, bauxite residue or "red mud", and other impure materials containing small amounts of alumina or boehmite. Purity of the boehmite precipitate is consistently greater than about 99 wt % and usually greater than about 99.9 wt %.

The boehmite precipitate is separated from the heated solution to form a used solution which may be reused in the Bayer process for digestion of bauxite or other chemical process use. It is an advantage of the invention that boehmite is precipitated from the aluminate solution without neutralization by acids or CO$_2$, so that the used solution generally contains a higher concentration of caustic soda than the aluminate solution.

DETAILED DESCRIPTION OF A PREFERRED EMBODIMENT

Figure 1:
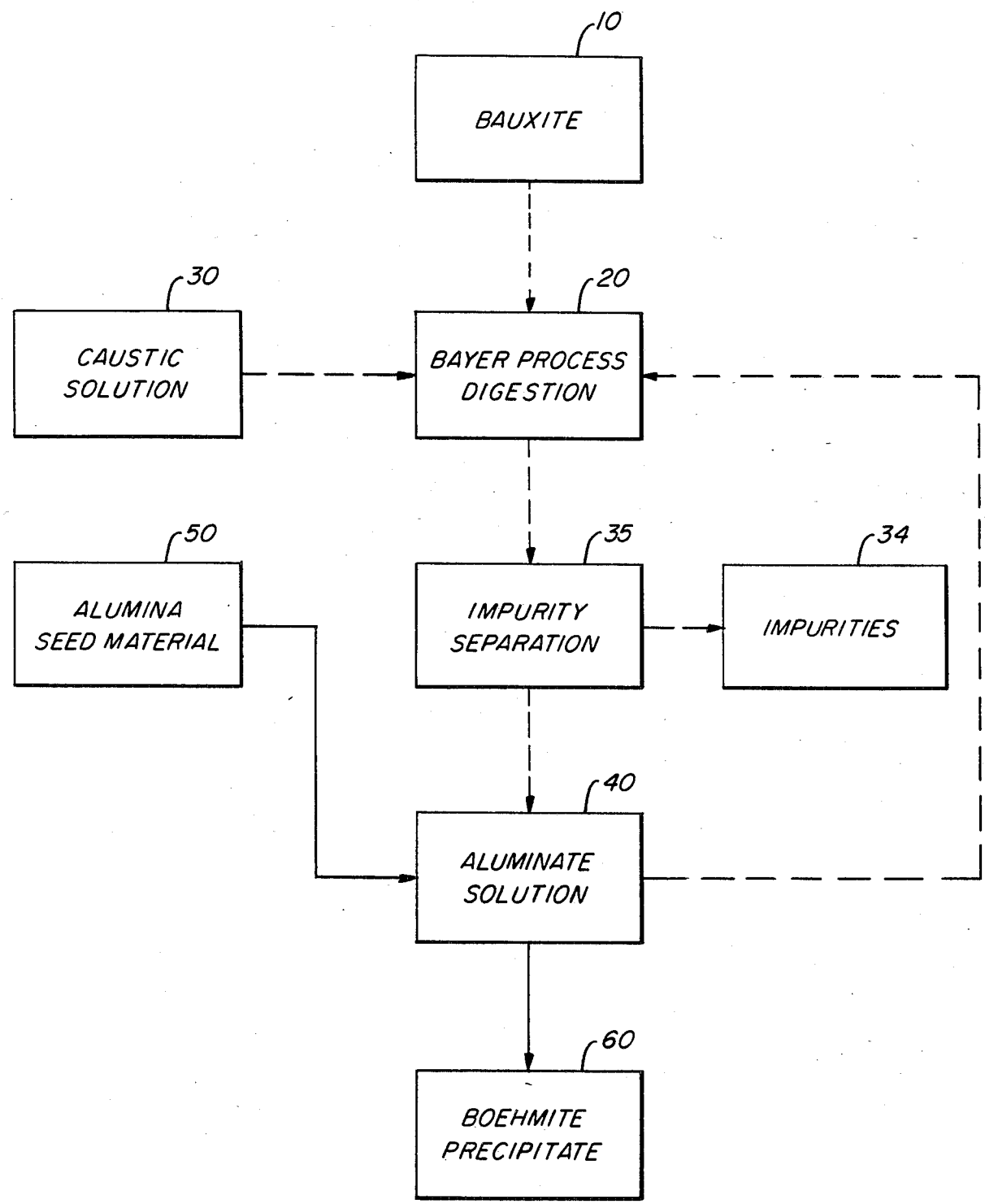
FIG. 1 is a schematic flowsheet diagram of the boehmite production process of the present invention.

Referring now to FIG. 1, the present invention is practiced by providing bauxite 10 or a similar alumina-bearing material to a Bayer process digestion tank 20 wherein the bauxite or similar material is reacted at elevated temperature and pressure with an aqueous caustic soda solution 30 containing dissolved NaOH and Na$_2$CO$_3$. Impurities 34 comprising bauxite residue or "red mud" are removed in an impurity separation step 35, and the resulting sodium aluminate solution is transferred to a reaction vessel 40 where it is heated under pressure to a preferred temperature of about 125° C. The sodium aluminate solution contains about 190–210 g/l total caustic soda (expressed as Na$_2$CO$_3$) and about 120–140 g/l total alumina (expressed as Al$_2$O$_3$. The weight ratio of Al$_2$O$_3$ to caustic soda (expressed as Na$_2$CO$_3$) is about 0.60 to 0.70.

An alumina seed material 50 is added to the reaction vessel 40 to form a precipitate 60 comprising substantially pure boehmite. The seed material 50 is preferably boehmite and boehmite gel is particularly preferred. The precipitate separated from the heated solution consistently has a purity of greater than about 99 wt % boehmite, usually greater than about 99.9 wt %. The used solution can be recycled for reaction with bauxite in the digestion tank 20 or other chemical process use.

The following examples illustrate some preferred embodiments of the invention.

EXAMPLE 1

A caustic aluminate liquor having the starting composition shown in Table I was prepared by digesting commercial grade alumina trihydrate, a product of the Bayer process, in caustic liquor for 30 minutes at 150° C.

TABLE I

| Liquor Composition | Starting | Final (6 hr.) |
| --- | --- | --- |
| Caustic Soda (as $Na_2CO_3$), g/l | 202.3 | 203.7 |
| Alumina (as $Al_2O_3$), g/l | 131.5 | 120.2 |
| Total Alkali (as $Na_2CO_3$), g/l | 251.6 | 253.3 |
| Ratio ($Al_2O_3$/Caustic Soda) | 0.650 | 0.590 |

Two liters of the liquor were mixed with 200 g of a synthetically prepared, well-crystallized boehmite seed and the resulting slurry was rapidly heated to 125° C. and maintained at that temperature for a period of 6 hours. The slurry was then blown out of the autoclave by applying gas pressure into another vessel at atmospheric pressure and rapidly filtered to separate the solid product from the used liquor. The used liquor was then analyzed for composition, as shown in Table I. From the difference in $Al_2O_3$ concentration between starting and final liquors, it can be seen that 11.3 g/l $Al_2O_3$ precipitated out.

The solid precipitate was washed with clean water, dried for 4 hours at 105° C. and analyzed by X-ray diffraction. The X-ray diffraction pattern shown in Table IA reveals that the final product is entirely boehmite with no traces of any other aluminum compounds.

TABLE IA

| 2-Theta | D-Spacing | Peak Intensity | I/I-max |
| --- | --- | --- | --- |
| 14.56 | 6.0849 | 11706 | 100.0 |
| 22.18 | 4.0084 | 83 | 0.7 |
| 28.26 | 3.1575 | 6760 | 57.8 |
| 38.43 | 2.3423 | 5679 | 48.5 |
| 44.52 | 2.0352 | 89 | 0.8 |
| 45.86 | 1.9787 | 587 | 5.0 |
| 49.01 | 1.8585 | 4765 | 40.7 |
| 49.30 | 1.8484 | 3181 | 27.2 |
| 51.70 | 1.7680 | 670 | 5.7 |
| 55.33 | 1.6605 | 1586 | 13.5 |
| 55.87 | 1.6457 | 98 | 0.8 |
| 60.63 | 1.5273 | 1185 | 10.1 |
| 64.18 | 1.4511 | 1315 | 11.2 |
| 65.08 | 1.4332 | 755 | 6.4 |
| 67.07 | 1.3954 | 206 | 1.8 |
| 67.26 | 1.3920 | 168 | 1.4 |
| 67.77 | 1.3828 | 979 | 8.4 |
| 72.04 | 1.3108 | 1505 | 12.9 |
| 78.22 | 1.2221 | 205 | 1.8 |
| 79.31 | 1.2080 | 149 | 1.3 |
| 81.76 | 1.1779 | 444 | 3.8 |
| 83.23 | 1.1608 | 670 | 5.7 |

Figure 2:
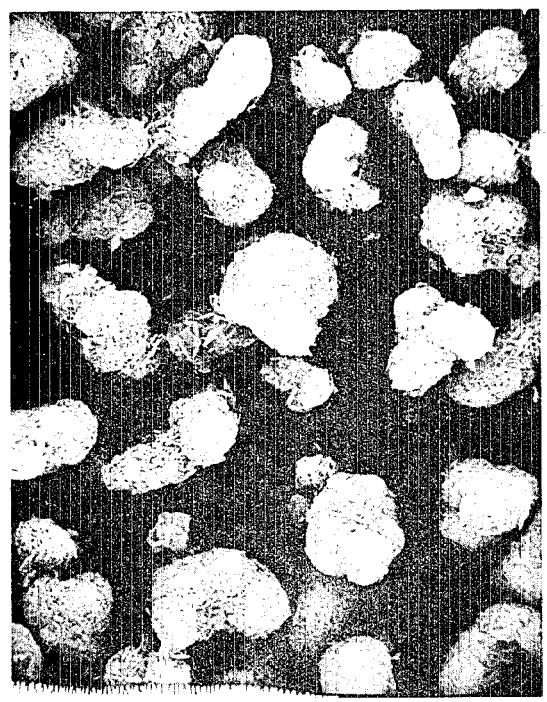
FIGS. 2–6 are scanning electron microphotographs of boehmite crystals produced by the process of the present invention.

A scanning electron microscope (SEM) was used to examine physical structure of the solid product. A 1000X SEM photograph of this material is shown in FIG. 2.

EXAMPLE 2

A test similar to Example 1 was carried out using a liquor having the starting composition shown in Table II. The liquor was prepared by digesting alumina trihydrate in a synthetically prepared caustic solution having a composition similar to that used in the Bayer process for alumina production.

TABLE II

| Liquor Composition | Starting | Final (6 hr.) |
| --- | --- | --- |
| Caustic Soda (as $Na_2CO_3$), g/l | 186.2 | 201.6 |
| Alumina (as $Al_2O_3$), g/l | 125.0 | 100.6 |
| Total Alkali (as $Na_2CO_3$), g/l | 241.3 | 265.8 |
| Ratio ($Al_2O_3$/Caustic Soda) | 0.671 | 0.499 |

The seed used in this test was a poorly crystallized (as shown by broadening of X-ray diffraction lines) boehmite gel product sold commercially by Conoco Inc. under the trade name "Catapal". The precipitation was carried out for 6 hours at 125° C., using 100 g/l seed material. The final liquor and precipitate were analyzed as before (Table II).

Figure 3:

From the difference in alumina concentration of the starting and final liquors, it can be seen that 32 grams of alumina were precipitated per liter of original liquor. The product in this case was also found to be pure boehmite (with traces of amorphous material) by X-ray diffraction analysis. A SEM photograph of the product is shown in FIG. 3.

EXAMPLE 3

This experiment was similar to the ones performed earlier, except that the starting liquor was prepared by digestion of Trombetas (Brazil) bauxite. Composition of the liquor is shown in Table III.

TABLE III

| Liquor Composition | Starting | Final (6 hr.) |
| --- | --- | --- |
| Caustic Soda (as $Na_2CO_3$), g/l | 203.5 | 208.8 |
| Alumina (as $Al_2O_3$), g/l | 139.4 | 122.7 |
| Total Alkali (as $Na_2CO_3$), g/l | 253.6 | 260.2 |
| Ratio ($Al_2O_3$/Caustic Soda) | 0.685 | 0.588 |

Figure 4:
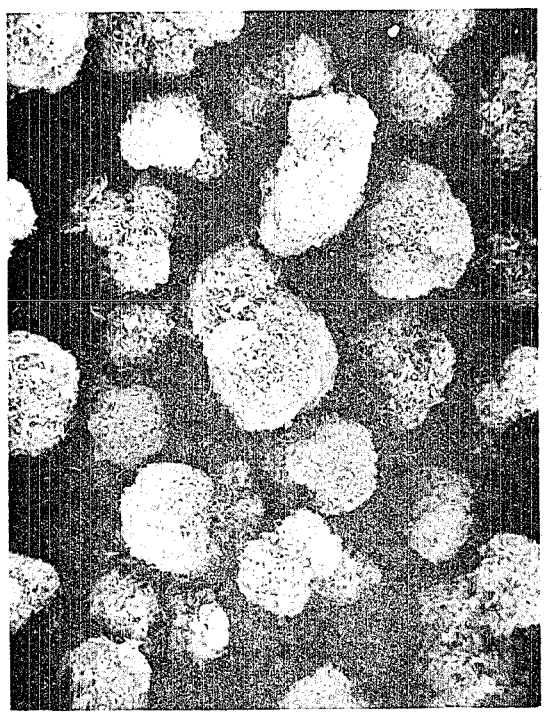

The liquor was seeded with 100 g/l of a Bayer alumina hydrate seed material and maintained at 125° C. for 6 hours. The liquor was then separated from the product and analyzed, as reported in Table III. The product was analyzed by X-ray diffraction and found to be entirely boehmite. A SEM photograph of the product is shown in FIG. 4. This product has a weight loss on ignition to 1200° C. of 15.66 wt % compared with the theoretical value of 15.0 wt % for pure boehmite.

EXAMPLE 4

The liquor compositions for this Example are shown in Table IV.

TABLE IV

| Liquor Composition | Starting | Final (6 hr.) |
| --- | --- | --- |
| Caustic Soda (as $Na_2CO_3$), g/l | 198.3 | 199.7 |
| Alumina (as $Al_2O_3$), g/l | 134.7 | 119.2 |
| Total Alkali (as $Na_2CO_3$), g/l | 244.7 | 246.4 |
| Ratio ($Al_2O_3$/Caustic Soda) | 0.679 | 0.597 |

Figure 5:
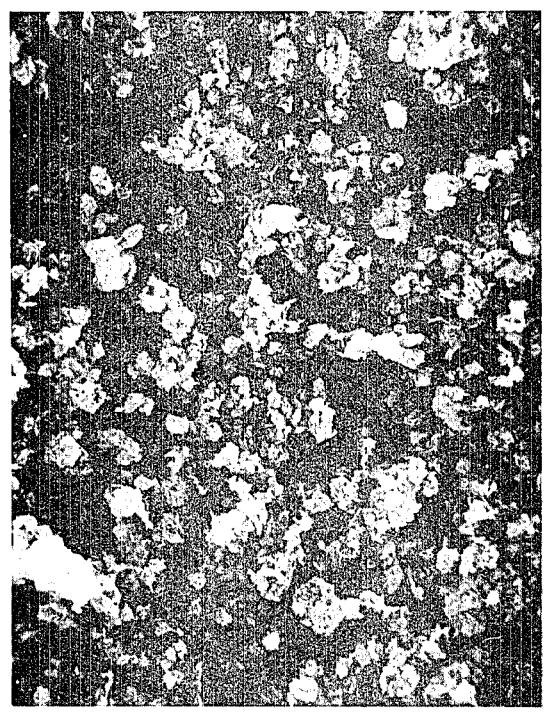

The seed material used in this Example was 100 g/l of the product obtained in Example 3. It was lightly ground in a laboratory mixer to break up agglomerates and then added to the liquor. The mixture was then maintained at 125° C. for 6 hours. Analysis of the final liquor is shown in Table IV. This data shows that 16.3 g of alumina precipitated out from one liter of the liquor. The product was analyzed by X-ray diffraction and found to be entirely boehmite. A SEM photograph of the product is shown in FIG. 5. The weight loss on ignition to 1200° C. was found to be 15.41 wt % compared with a theoretical value of 15.0 wt % for pure boehmite.

EXAMPLE 5

The liquor compositions for this Example are shown in Table V.

TABLE V

| Liquor Composition | Starting | Final (6 hr.) |
| --- | --- | --- |
| Caustic Soda (as $Na_2CO_3$), g/l | 203.2 | 201.4 |
| Alumina (as $Al_2O_3$), g/l | 141.0 | 114.1 |
| Total Alkali (as $Na_2CO_3$), g/l | 260.0 | 258.6 |
| Ratio ($Al_2O_3$/Caustic Soda) | 0.694 | 0.567 |

Figure 6:
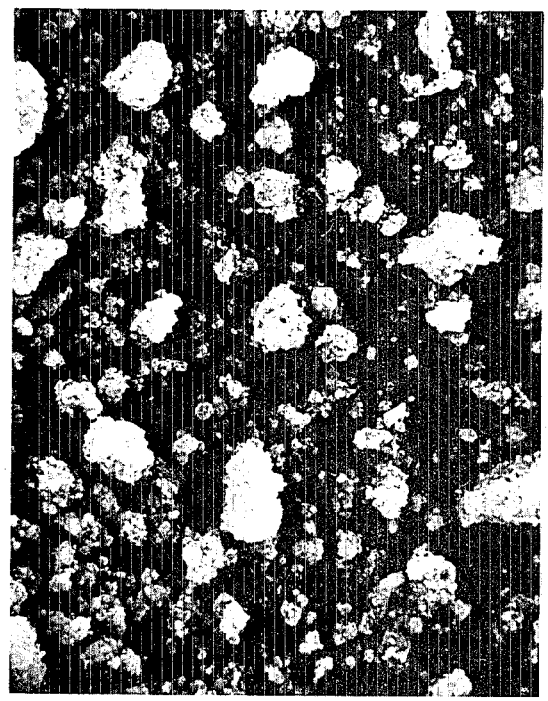

The seed material used in this Example was a gelatinous aluminum hydroxide prepared by neutralizing a caustic aluminate solution of Bayer process composition with a sodium bicarbonate solution. An X-ray diffraction pattern of the seed showed it to consist primarily of amorphous aluminum hydroxide mixed with minor amounts of crystalline aluminum hydroxides, gibbsite and boehmite. The mixture of liquor and 100 g/l seed was held at 125° C. for a period of 6 hours. Analysis of the residual liquor is shown in Table V. It was estimated from the liquor analyses that 25.8 g of alumina were precipitated per liter of liquor. The product was analyzed by X-ray diffraction and found to be boehmite containing a trace of amorphous material. A SEM photograph of the product is shown in FIG. 6.

With the foregoing detailed description of our invention in mind, numerous changes and modifications will occur to persons skilled in the art without departing from the spirit and scope of the following claims.

What is claimed is:

1. A process for producing substantially pure boehmite comprising the steps of
   (a) heating to a temperature of about 115°–145° C. an aqueous aluminate solution containing about 100–400 g/l caustic soda (expressed as $Na_2CO_3$) and about 0.50–0.80 grams $Al_2O_3$ per gram of caustic soda (expressed as $Na_2CO_3$),
   (b) treating the heated solution with a seed material consisting essentially of alumina, thereby to form a precipitate comprising greater than about 95 wt % boehmite, and
   (c) separating precipitated boehmite from the heated solution, thereby to form a used solution.

2. The process of claim 1 wherein the temperature of the heated solution is about 115°–135° C.

3. The process of claim 1 wherein the temperature of the heated solution is about 120°–130° C.

4. The process of claim 1 wherein the temperature of the heated solution is about 125° C.

5. The process of claim 1 wherein the caustic soda content of the heated solution is about 140–240 g/l (expressed as $Na_2CO_3$).

6. The process of claim 1 wherein the caustic soda content of the heated solution is about 190–210 g/l (expressed as $Na_2CO_3$).

7. The process of claim 1 wherein the seed material consists essentially of boehmite.

8. The process of claim 1 wherein the seed material consists essentially of boehmite gel.

9. The process of claim 1 wherein the precipitate comprises greater than about 99 wt % boehmite.

10. The process of claim 1 wherein the precipitate comprises greater than about 99.9 wt % boehmite.

11. The process of claim 1 wherein the aluminate solution contains about 0.60 to 0.70 grams $Al_2O_3$ per gram of caustic soda (expressed as $Na_2CO_3$).

12. The process of claim 1 wherein step (b) is performed without neutralizing the aluminate solution by addition of an acid or $CO_2$.

13. The process of claim 12 wherein the used solution in step (c) contains a higher concentration of caustic soda than the heated solution of step (a).

14. The process of claim 1 further comprising
   (d) digesting bauxite in said used solution.

15. A process for producing substantially pure crystalline boehmite comprising the steps of
   (a) heating to a temperature of about 115°–140° C. an aqueous aluminate solution containing about 140°–240 g/l caustic soda (expressed as $Na_2CO_3$) and about 0.60–0.70 grams $Al_2O_3$ per gram of caustic soda (expressed as $Na_2CO_3$),
   (b) treating the heated solution with a seed material consisting essentially of boehmite, thereby to form a precipitate comprising greater than about 99 wt % boehmite, and
   (c) separating precipitated boehmite from the heated solution, thereby to form a used solution.

16. The process of claim 15 wherein the aluminate solution contains about 190–210 g/l caustic soda (expressed as $Na_2CO_3$).

17. The process of claim 15 wherein step (b) is performed without addition of any acid or $CO_2$ to the aluminate solution.

18. The process of claim 17 wherein the used solution obtained in step (c) has a higher caustic soda concentration than the heated solution of step (a).

19. The process of claim 15 wherein the temperature of the heated solution is about 120°–130° C.

* * * * *